US009083041B2

(12) United States Patent
Vail et al.

(10) Patent No.: US 9,083,041 B2
(45) **Date of Patent: *Jul. 14, 2015**

(54) TRANSITION METAL HEXACYANOMETALLATE-CONDUCTIVE POLYMER COMPOSITE

(71) Applicant: Sharp Laboratories of America, Inc., Camas, WA (US)

(72) Inventors: Sean Andrew Vail, Vancouver, WA (US); Yuhao Lu, Vancouver, WA (US); David Russell Evans, Beaverton, OR (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/059,599

(22) Filed: Oct. 22, 2013

(65) Prior Publication Data

US 2014/0038044 A1 Feb. 6, 2014

Related U.S. Application Data

(63) Continuation-in-part of application No. 13/907,892, filed on Jun. 1, 2013, now Pat. No. 8,968,925, which is a continuation-in-part of application No. 13/897,492, filed on May 20, 2013, which is a continuation-in-part (Continued)

(51) Int. Cl.
*H01M 4/133* (2010.01)
*H01M 4/36* (2006.01)

(Continued)

(52) U.S. Cl.
CPC .............. *H01M 4/364* (2013.01); *H01M 4/136* (2013.01); *H01M 4/58* (2013.01); *H01M 4/60* (2013.01); *H01M 4/606* (2013.01); *H01M 4/608* (2013.01)

(58) Field of Classification Search
CPC ..... H01M 4/136; H01M 4/58; H01M 10/054; H01M 4/133; H01M 4/1345; H01M 4/04; H01M 4/381; Y02E 60/122; Y02E 60/50; C01B 31/00; C01B 31/04; C01B 31/30; C01D 1/02
USPC ...................................... 429/211; 252/519.14
See application file for complete search history.

(56) References Cited

U.S. PATENT DOCUMENTS

2012/0328936 A1* 12/2012 Wessells et al. .............. 429/188
2013/0052538 A1* 2/2013 Pasta et al. .................... 429/245

(Continued)

OTHER PUBLICATIONS

A. Widmann et al., "Structure, Insertion Electrochemistry, and Magnetic Properties of a New Type of Substitutional Solid Solutions ..", Inorganic Chemistry 2002, 41, 5706-5715.

(Continued)

*Primary Examiner* — Cynthia H Kelly
*Assistant Examiner* — Monique Wills
(74) *Attorney, Agent, or Firm* — Law Office of Gerald Maliszewski; Gerald Maliszewski

(57) ABSTRACT

A transition metal hexacyanometallate (TMHCM)-conductive polymer (CP) composite electrode is provided. The battery electrode is made up of a current collector and a transition metal hexacyanometallate-conductive polymer composite overlying the current collector. The transition metal hexacyanometallate-conductive polymer includes a $A_XM1_YM2_Z(CN)_N \cdot MH_2O$ material, where A may be alkali metal ions, alkaline earth metal ions, ammonium ions, or combinations thereof, and M1 and M2 are transition metal ions. The transition metal hexacyanometallate-conductive polymer composite also includes a conductive polymer material. In one aspect, the conductive polymer material is polyaniline (PANI) or polypyrrole (Ppy). Also presented herein are methods for the fabrication of a TMHCM-CP composite.

16 Claims, 6 Drawing Sheets

BATTERY 400
CATHODE BATTERY ELECTRODE 300a
ANODE BATTERY ELECTRODE 300b
+ LOAD -
CURRENT COLLECTOR 302
CURRENT COLLECTOR 302
200 TMHCM-CP COMPOSITE
200 TMHCM-CP COMPOSITE
402 ELECTROLYTE
402 ELECTROLYTE
404 ION-PERMEABLE MEMBRANE

Related U.S. Application Data of application No. 13/872,673, filed on Apr. 29, 2013, which is a continuation-in-part of application No. 13/752,930, filed on Jan. 29, 2013, which is a continuation-in-part of application No. 13/603,322, filed on Sep. 4, 2012, which is a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012.

(51) Int. Cl.

| | |
|---|---|
| ***H01M 4/58*** | (2010.01) |
| ***H01M 4/60*** | (2006.01) |
| ***H01M 4/136*** | (2010.01) |

(56) References Cited

U.S. PATENT DOCUMENTS

| | | | | |
|---|---|---|---|---|
| 2013/0266861 | A1* | 10/2013 | Lu et al. | 429/211 |
| 2014/0127560 | A1* | 5/2014 | Wessells et al. | 429/188 |

OTHER PUBLICATIONS

C. D. Wessells, R. A. Huggins, and Y. Cui, "Copper Hexacyanoferrate Battery Electrodes with Long Cycle Life and High Power", Nature Communications 2011, 2, Article number:550.

C. D. Wessells et al., "Nickel Hexacyanoferrate Nanoparticle Electrodes for Aqueous Sodium and Potassium Ion Batteries", Nano Letters 2011, 11, 5421-5425.

A. Eftekhari, "Potassium Secondary Cell Based on Prussian Blue Cathode", Journal of Power Sources 2004, 126, 221-228.

Y. Lu, L. Wang, J. Cheng, and J. B. Goodenough, "Prussian blue: A New Framework for Sodium Batteries", Chemical Communications 2012, 48, 6544-6546.

A. A. Karyakin, "Prussian Blue and Its Analogues: Electrochemistry and Analytical Applications", Electroanalysis 2001, 13, 813-819.

P. R. Somani and S. Radhakrishnan, "Electrochromic Materials and Devices: Present and Future", Materials Chemistry and Physics 2002, 77, 117-133.

N. R. de Tacconi and K. Rajeshwar, "Metal Hexacyanoferrates: Electrosynthesis, in Situ Characterization, and Applications", Chemistry of Materials 2003, 15, 3046-3062.

V. Noël et al., "Composite Films of Iron(III) Hexacyanoferrate and Poly (3,4-ethylenedioxythiophene): Electro . . . ", Journal of Electroanalytical Chemistry 2000, 489, 46-54.

K. Ogura et al., "Studies on Ion Transport During Potential Cycling of a Prussian Blue (inner) | Polyaniline . . . ", Journal of Electroanalytical Chemistry 2000, 486, 119-125.

P. J. Kulesza et al., "Electrochemical Preparation and Characterization of Hybrid Films Composed . . . ", Electrochimica Acta 2001, 46, 4065-4073.

S. Lupu et al., "Electrochemical Preparation and Characterisation of Bilayer Films Composed by Prussian Blue and . . . ", Electrochemistry Communications 2002, 4, 753-758.

P. Somani and S. Radhakrishnan, "Charge Transport Processes in Conducting Polypyrrole/Prussian Blue Bilayers", Materials Chemistry and Physics 2002, 76, 15-19.

A. Lisowska-Oleksiak et al., "Poly(3,4-ethylenedioxythiophene)-Prussian Blue Hybrid Material: Evidence of Direct Chemical . . . " Electrochemistry Communications 2006, 8, 2006.

X. Feng et al., "Synthesis of Functional Polypyrrole/Prussian Blue and Polypyrrole/Ag Composite Microtubes by Using a Reactive Template", Nanotechnology 2007, 18, 195603.

P. Somani and S. Radhakrishnan, "Electrochromic Response in Polypyrrole Sensitized by Prussian Blue", Chemical Physics Letters 1998, 292, 218-222.

D. M. DeLongchamp et al., "Multiple-Color Electrochromism from Layer-by-Layer-Assembled Polyaniline/Prussian Blue Nanocomposite Thin ..", Chemistry of Materials 2004, 16, 4805.

S. Duluard et al., "Electrochromic Devices Based on in situ Polymerised EDOT and Prussian . . . ", New Journal of Chemistry 2011, 35, 2314-2321.

A. Curulli et al., "Pt Based Enzyme Electrode Probes Assembled with Prussian Blue and Conducting Polymer Nanostructures", Biosensors and Bioelectronics 2004, 20, 1223-1232.

A. Ernst et al., "Hybrid Bioelectrocatalyst for Hydrogen Peroxide Reduction: Immobilization of Enzyme Within Organic— . . . ", Bioelectrochemistry 2007, 71, 23-28.

S. Lupu et al., "Voltammetric Determination of Dopamine at PEDOT-Prussian Blue Composite Modified Electrodes", Revue Roumaine de Chimie 2008, 53, 931-939.

Y. Miao et al., "Assembly and Electroanalytical Performance of Prussian Blue/Polypyrrole Nanoparticles . . . ", Science and Technology of Advanced Materials 2009, 10, 025001.

* cited by examiner

200

$A_XM1_YM2_Z(CN)_N.mH_2O$

202

400 BATTERY
CATHODE
BATTERY ELECTRODE
300
ANODE
BATTERY ELECTRODE
406
402
ELECTROLYTE
402
ELECTROLYTE
404 ION-PERMEABLE
MEMBRANE

TMHCM
TMHCM-Ppy(1)
VOLTAGE (V)
4.0
3.8
3.6
3.4
3.2
3.0
2.8
2.6
2.4
2.2
2.0
0
15
30
45
60
75
90
105
120
135
150
DISCHARGE CAPACITY (mAh/g)

START
1000
1002
FORMING CP SOLUTION SUSPENDED IN MATRIX WITH M1 ION-CONTAINING MATERIAL AND $AM2(CN)_6$ MATERIAL
1004
FORMING $A_XM1_YM2_Z(CN)_N \cdot mH_2O$-CP COMPOSITE START
1100
1102
PROVIDING SOLUTION OF MONOMERS IN SOLVENT
1104
ADDING $A_XM1_YM2_Z(CN)_N \cdot mH_2O$ MATERIAL
1106
POLYMERIZING MONOMERS
1108
FORMING $A_XM1_YM2_Z(CN)_N \cdot mH_2O$-CP COMPOSITE

TRANSITION METAL HEXACYANOMETALLATE-CONDUCTIVE POLYMER COMPOSITE

RELATED APPLICATIONS

This application is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

BACKGROUND OF THE INVENTION

1. Field of the Invention

This invention generally relates to electrochemical cells and, more particularly, to a transition metal hexacyanometallate (TMHCM)-conductive polymer (CP) composite battery electrode, and associated fabrication processes.

2. Description of the Related Art

Modern rechargeable lithium battery technology has triggered the portable electronic devices revolution due to high power density, long cycle life, and overall performance reliability. The rechargeable lithium battery consists of a cathode (positive electrode) and anode (negative electrode), separated by a lithium ion ($Li^+$)-permeable membrane. A solution and/or polymer rich in $Li^+$ is employed in order to ensure that lithium ions can freely migrate back and forth between the positive and negative electrodes. Common positive electrode materials include transition metal oxides such as lithium cobalt oxide ($LiCoO_2$), lithium manganese oxide ($LiMn_2O_4$), and lithium iron phosphate ($LiFePO_4$), in addition to various derivatives. Within these materials, lithium ions can move within their interstitial space(s) both freely and reversibly. In general, metallic lithium, alloys, and carbonaceous materials can be utilized as the negative electrode. When the rechargeable lithium battery does not include any metallic electrode, it is commonly referred to as lithium-ion battery (LIB). During the discharge process in a LIB, lithium ions are extracted from the negative electrode and subsequently inserted into the positive electrode. At the same time, electrons pass through an external circuit from the negative electrode to the positive electrode to generate electric power. During the charge process, ions and electrons move along the reverse directions and are restored to their original locations.

Although LIBs have been employed successfully over a broad range of commercial applications, lithium demand strains natural reserves, and potential fluctuations in price have motivated the development of a low-cost, rechargeable battery technology as an alternative to LIB. In light of this, sodium-ion batteries (NIBs) have received increased attention due primarily to the fact that sodium has similar properties to lithium, but also boasts the benefits of both reduced cost and virtually unlimited availability. However, similar to LIBs, NIBs require appropriate sodium ion ($Na^+$)-host materials. Indeed, significant effort has been devoted to direct duplication of $Li^+$-host structures for application as $Na^+$-host electrode materials for NIBs. For example, $NaCoO_2$, $NaMnO_2$, $NaCrO_2$, and $Na_{0.85}Li_{0.17}Ni_{0.21}Mn_{0.64}O_2$, with an analogous layered-structure to $LiCoO_2$, have been developed for NIBs. Similarly, $Co_3O_4$ with Spinel structure, $Na_3V_2(PO_4)_3$ with NASICON structure, and $NaFePO_4$ with Olivine structure have been employed in sodium batteries. In addition, sodium fluorophosphates, such as $Na_2PO_4F$, $NaVPO_4F$, and $Na_{1.5}VOPO_4F_{0.5}$ have also been integrated as the positive electrode for sodium batteries.

Overall, it is impractical to simply adopt conventional $Li^+$-host materials and structures as $Na^+$ or potassium ion ($K^+$)-host compounds, since $Na^+$ and $K^+$ are much larger than $Li^+$ and, consequently, severely distort the structures of $Li^+$-host compounds during the intercalation process. In light of this, it is critical to develop new $Na^+/K^+$-host materials with large interstitial space(s) through which $Na^+/K^+$ can migrate, both easily and reversibly. In general, both $Na^+$ and $K^+$ have been shown to readily intercalate into metal hexacyanometallate (MHCF) compounds. Widmann et al. demonstrated that $K^+$ reversibly inserts/deinserts into/from copper, nickel, and iron hexacyanoferrates/hexacyanocobaltates [Prussian blue analogues (PBAs) comprising $KCuFe(CN)_6$, $KNiFe(CN)_6$, and $KFeFe(CN)_6$] in an aqueous solution].[1] Wessells et al. synthesized copper ($KCuFe(CN)_6$) and nickel hexacyanoferrates ($KNiFe(CN)_6$) and studied the behaviors of $Na^+/K^+$ insertion in aqueous media using a three-electrode cell.[2,3] Overall, these results showed that capacities of the materials could achieve ~60 milliamp-hours per gram (mAh/g). Eftekhari et al. assembled an iron hexacyanoferrate (Prussian blue)/potassium battery using an organic electrolyte comprising 1M $KBF_4$ in ethylene carbonate/ethylmethyl carbonate (3:7).[4] Overall, the results showed that Prussian blue was a robust electrode material for a potassium-ion battery and demonstrated a reversible capacity of ~75 mAh/g. Finally, Lu et al. investigated a series of PBAs in a sodium battery with an organic electrolyte and reported that $KFe(II)Fe(III)(CN)_6$ demonstrated the highest capacity (~95 mAh/g), while $KMnFe(CN)_6$, $KNiFe(CN)_6$, $KCuFe(CN)_6$, and $KCoFe(CN)_6$ exhibited capacities of 50~70 mAh/g.[5]

Prussian blue and its analogues belong to a class of mixed valence compounds called transition metal hexacyanometallates (TMHCMs). In general, TMHCMs are characterized by a formula corresponding to $A_xM_1{}^mM_2{}^n(CN)_6$, where $M_1{}^{m+}$ and $M_2{}^{n+}$ are transition metals with different formal oxidation numbers (m and n). Usually, the transition metal hexacyanometallates may sequester a variety of different ions ($A=Co^+$, $Na^+$, $K^+$, $NH_4{}^+$, $Co^{2+}$, $Cu^{2+}$, for example), as well as various amounts of water ($H_2O$) within the crystal structure.

FIG. 1 is a schematic diagram depicting the framework of $A_xM_1M_2(CN)_6$ (prior art). The crystal structure of transition metal hexacyanometallates exhibits an open framework and is analogous to that of the $ABX_3$ perovskite, as shown. $M_1{}^{m+}$ and $M_2{}^{n+}$ transition metal ions are in ordered arrangement on the B sites. The large, tetrahedrally coordinated A sites can host both alkali and alkaline earth ions ($A_x$) in addition to species such as $H_2O$. The number of alkali (or alkaline earth ions) in the large cages of this crystallographically porous framework may vary from x=0 to x=2 depending on the respective valence(s) of $M_1$ and $M_2$. The open framework structure of the transition metal hexacyanometallates facilitates both rapid and reversible intercalation processes for alkali and alkaline earth ions ($A_x$). In general, sodium or potassium ions ($Na^+$ or $K^+$) are located at the A-site, as is also the case for Mg or Ca ions ($Mg^{2+}$ or $Ca^{2+}$).

In addition to the demonstrated potential for TMHCFs within the context of battery applications as described above, a set of unique electrochemical behaviors qualify these materials as promising candidates for alternate technologies including sensors for non-electroactive cations, transducers for hydrogen peroxide, enzyme-based biosensors, electrochromic devices, ion exchange media, electrocatalysis, and photoelectrochemical/photocatalytic devices.[6-8]

In general, conductive polymers (CPs) or intrinsically conducting polymers (ICPs) are organic polymeric materials that conduct electrical charge and may exhibit either metallic conductivity or be semiconducting. Although a large variety of conductive polymers have been investigated, only a limited number have been reduced to practical (commercial) application due to both robust performance and acceptable levels of processsability. In particular, poly(acetylene)s, poly(p-phenylene vinylene), poly(pyrrole)s, poly(aniline)s, poly (thiophene)s, poly(3,4-ethylenedioxythiophene), and poly(p-phenylene sulfide) have been extensively investigated, both in terms of synthesis and properties. Despite commercial challenges for the wide-scale integration of conductive polymers including cost, poor to modest solubility, compositional/material performance inconsistencies, and lack of compatibility with direct melt processing, numerous potential applications have been suggested including photovoltaics (PV), printed electronics, organic light-emitting diodes (OLEDs), actuators, electrochromics, batteries/supercapacitors, chemical/biological sensors, flexible displays, and electromagnetic shielding, among others.

In general, the structural prerequisite for organic polymers to function as intrinsically conductive materials is the existence of a conjugated network (alternating single and double bonds) or, alternatively, conjugated units linked with atoms (such as sulfur or nitrogen) that possess p-orbitals capable of providing continuous orbital overlap. Furthermore, electronic conductivity within polymer systems requires not only the presence of charge carriers but also the facile migration of charge carriers, the latter of which can be accomplished through uninterrupted orbital overlap along the polymer backbone.

In light of the fact that most organic polymers do not possess intrinsic charge carriers and consequently behave as insulators in their native, updoped states, strategic "doping" is often employed. Accordingly, charge carriers may be introduced by means of either partial oxidation (p-doping) or partial reduction (n-doping). Overall, organic polymers can be "doped" through a variety of methods including chemical, electrochemical, photochemical, etc. For example, treatment of trans-polyacetylene with iodine affords a "doped", highly conductive form of the material. Non-redox doping represents an alternative strategy for increasing the conductivity of conjugated polymers. In this case, the employed doping does not involve an alteration in the number of electrons associated with the polymer backbone, but rather includes a rearrangement of energy levels. A classic example of this type of doping is the treatment of polyaniline (PANI, emeraldine base form) with protic acids such as hydrochloric (HCl) or para-toluenesulfonic acid (p-TSA). In the case of PANI (emeraldine base) treatment with HCl to form the emeraldine hydrochloride, a conductivity enhancement approaching ten orders of magnitude may be realized. Finally, highly conductive forms of polypyrrole (Ppy) can be realized by oxidative (p-doping) with various chemical agents such as ferric chloride, although electrochemical oxidation is also possible. Overall, a vast majority of conventional conjugated polymers can be appropriately p- or n-doped (or both) to afford intrinsically conductive species through a wide variety of methods, although only a few examples have been provided.

Previously, Noël et al. described the preparation of an iron(III) hexacyanoferrate and poly(3,4-ethylenedioxythiophene) (PEDOT) composite on a platinum electrode using a potentiostatic method.[9] Ogura et al. reported an investigation of ion transport during redox switching of a Prussian blue (PB)-polyaniline (PANI) bilayer electrode by employing an electrochemical quartz crystal microbalance (EQCM) and in situ Fourier transform infrared (FTIR) reflection spectroscopy.[10] Kulesza et al. provided a method for fabricating composite organic/inorganic (hybrid) films on electrode surfaces using electrodeposition with potential cycling through which alternate layers of PANI and metal hexacyanoferrate were realized.[11] Lupu et al. described the fabrication and electrochemical behavior of bilayer films of iron(III) hexacyanoferrate and poly[4,4'-bis(butylsulphanyl)-2,2'-bithiophene] on a platinum electrode.[12] Somani et al. reported the electronic transport properties of electrochemically deposited conducting polypyrrole (Ppy)/PB bilayer films through an investigation of current-voltage characteristics under dark and white light illumination.[14] Lisowska-Oleksiak et al. provided the synthesis of a PEDOT and PB analogue composite material for which a PB network was formed inside the PEDOT matrix using multicyclic polarization of an electrode.[14] Feng et al. reported the one-pot synthesis of Ppy/PB and Ppy/Ag composite microtubes using methyl orange as a reactive, self-degrading template.[15] Furthermore, the mechanism of formation, structural characteristics, conductivity, and electrochemical properties of the microtubes were reported.

Somani et al. investigated the electrochromic response of Ppy/PB composites in different electrolytes.[16] The composite films were prepared through deposition of PB films on top of conductive Ppy films, whereby both films were fabricated by electrochemical methods. DeLongchamp et al. demonstrated the fabrication of a multiply colored electrochromic electrode using a layer-by-layer (LBL) assembly technique by exploiting intrinsic electrostatic attraction between a polycationic polymer (PANI) and a dispersion of negatively charged PB nanoparticles.[17] Duluard et al. reported the assembly of organic/inorganic (hybrid) electrochromic devices [transparent conducting oxide (TCO)/inorganic counter electrode/hydrophobic electrolytic membrane/polymeric working electrode/TCO] featuring working electrodes consisting of polymer films prepared by in situ polymerisation of 3,4- ethylene dioxythiophene (EDOT) with galvanostatically deposited PB films as counter electrodes.[18]

Curulli et al. described the preparation of a composite comprising conductive nanostructures of electropolymerized 1,2-diaminobenzene and PB on platinum electrodes wherein PB functioned as the active component for hydrogen peroxide ($H_2O_2$) detection.[19] Ernst et al. provided structured films comprising PB realized through assembly within ultra-thin layers of 4(pyrrole-1-yl)-benzoic acid and PEDOT using alternate immersions.[20] The composite film functioned as a redox conducting template for permanent attachment of horseradish peroxidase (HRP). Lupu et al. reported the preparation of PEDOT-PB films by a two-step method involving electrogeneration of a PEDOT film in the presence of ferricyanide ions with subsequent cycling of the composite electrode in an aqueous solution of ferric ions.[21] The composite film demonstrated a high electrocatalytic effect towards dopamine oxidation in the presence of ascorbic acid. Miao et al. provided a reverse emulsion synthesis of PB/Ppy nanoparticles and subsequent immobilization on cysteine-modified gold electrodes.[22] Furthermore, cyclic voltammetry confirmed a high electrocatalytic activity for the PB-Ppy materials towards hydrogen peroxide.

With respect to a sodium battery, the transition metal hexacyanometallate materials in conductive polymer composites may be represented by the general expression: $Na_2M_1M_2(CN)_6$, $NaM_1M_2(CN)_6$, $NaKM_1M_2(CN)_6$, and $M_1M_2(CN)_6$, where $M_1$, $M_2$=Ti, Cr, Mn, Fe, Co, Ni, Cu, Zn, etc., and the ratio of $M_1$ and $M_2$ can be an arbitrary number. Some examples include: $Na_2Fe_2(CN)_6$, $NaFe_2(CN)_6$, $NaKFe_2(CN)_6$, and $Fe_2(CN)_6$. With respect to a potassium battery, the transition metal hexacyanometallate materials in the conductive polymer composites may be represented by the general expression: $K_2M_1M_2(CN)_6$, $KM_1M_2(CN)_6$, $NaKM_1M_2(CN)_6$, and $M_1M_2(CN)_6$, where $M_1$, $M_2$=Ti, Cr, Mn, Fe, Co, Ni, Cu, Zn, etc., and the ratio of $M_1$ and $M_2$ can be an arbitrary number. Some examples include: $K_2Fe_2(CN)_6$, $KFe_2(CN)_6$, and NaKFe2$(CN)_6$.

With respect to a magnesium battery, the transition metal hexacyanometallate materials in the conductive polymer composites may be represented by the general expression: $MgM_1M_2(CN)_6$, $Mg_{0.5}M_1M_2(CN)_6$, and $M_1M_2(CN)_6$, where $M_1$, $M_2$=Ti, Cr, Mn, Fe, Co, Ni, Cu, Zn, etc., and the ratio of $M_1$ and $M_2$ can be an arbitrary number. Some examples include: $MgFe_2(CN)_6$, $Mg_{0.5}Fe_2(CN)_6$, $Fe_2(CN)_6$. With respect to a calcium battery, the transition metal hexacyanometallate materials in the conductive polymer composites may be represented by the general expression: $CaM_1M_2(CN)_6$, $Ca_{0.5}M_1M_2(CN)_6$, and $M_1M_2(CN)_6$, where $M_1$, $M_2$=Ti, Cr, Mn, Fe, Co, Ni, Cu, Zn, etc., and the ratio of $M_1$ and $M_2$ can be an arbitrary number. Some examples include: $CaFe_2(CN)_6$, $Ca_{0.5}Fe_2(CN)_6$, and $Fe_2(CN)_6$.

(1) A. Widmann, H. Kahlert, I. Petrovic-Prelevic, H. Wulff, J. V. Yakhmi, N. Bagkar, and F. Scholz, "Structure, Insertion Electrochemistry, and Magnetic Properties of a New Type of Substitutional Solid Solutions of Copper, Nickel and Iron Hexacyanoferrates/Hexacyanocobaltates", *Inorganic Chemistry* 2002, 41, 5706-5715.

(2) C. D. Wessells, R. A. Huggins, and Y. Cui, "Copper Hexacyanoferrate Battery Electrodes with Long Cycle Life and High Power", *Nature Communications* 2011, 2, Article number: 550.

(3) C. D. Wessells, S. V. Peddada, R. A. Huggins, and Y. Cui, "Nickel Hexacyanoferrate Nanoparticle Electrodes For Aqueous Sodium and Potassium Ion Batteries", *Nano Letters* 2011, 11, 5421-5425.

(4) A. Eftekhari, "Potassium Secondary Cell Based on Prussian Blue Cathode", *Journal of Power Sources* 2004, 126, 221-228.

(5) Y. Lu, L. Wang, J. Cheng, and J. B. Goodenough, "Prussian Blue: A New Framework for Sodium Batteries", *Chemical Communications* 2012, 48, 6544-6546.

(6) A. A. Karyakin, "Prussian Blue and Its Analogues: Electrochemistry and Analytical Applications", *Electroanalysis* 2001, 13, 813-819.

(7) P. R. Somani and S. Radhakrishnan, "Electrochromic Materials and Devices: Present and Future", *Materials Chemistry and Physics* 2002, 77, 117-133.

(8) N. R. de Tacconi, K. Rajeshwar, and R. O. Lezna, "Metal Hexacyanoferrates: Electrosynthesis, in Situ Characterization, and Applications", *Chemistry of Materials* 2003, 15, 3046-3062.

(9) V. Noël, H. Randriamahazaka and C. Chevrot, "Composite Films of Iron(III) Hexacyanoferrate and Poly(3,4-ethylenedioxythiophene): Electrosynthesis and Properties", *Journal of Electroanalytical Chemistry* 2000, 489, 46-54.

(10) K. Ogura, K. Nakaoka, and M. Nakayama, "Studies on Ion Transport During Potential Cycling of a Prussian Blue (inner) I Polyaniline (outer) Bilayer Electrode by Quartz Crystal Microbalance and Fourier Transform Infrared Reflection Spectroscopy", *Journal of Electroanalytical Chemistry* 2000, 486, 119-125.

(11) P. J. Kulesza, K. Miecznikowski, M. A. Malik, M. Galkowski, M. Chojak, K. Caban, and A. Wieckowski, "Electrochemical Preparation and Characterization of Hybrid Films Composed of Prussian Blue Type Metal Hexacyanoferrate and Conducting Polymer", *Electrochimica Acta* 2001, 46, 4065-4073.

(12) S. Lupu, C. Mihailciuc, L. Pigani, R. Seeber, N. Totir, and C. Zanardi, "Electrochemical Preparation and Characterisation of Bilayer Films Composed by Prussian Blue and Conducting Polymer", *Electrochemistry Communications* 2002, 4, 753-758.

(13) P. Somani and S. Radhakrishnan, "Charge Transport Processes in Conducting Polypyrrole/Prussian Blue Bilayers", *Materials Chemistry and Physics* 2002, 76, 15-19.

(14) A. Lisowska-Oleksiak, A. P. Nowak, and V. Jasulaitiene, "Poly(3,4-ethylenedioxythiophene)-Prussian Blue Hybrid Material: Evidence of Direct Chemical Interaction between PB and pEDOT", *Electrochemistry Communications* 2006, 8, 2006.

(15) X. Feng, Z. Sun, W. Hou, and J-J. Zhu, "Synthesis of Functional Polypyrrole/Prussian Blue and Polypyrrole/Ag Composite Microtubes by Using a Reactive Template", *Nanotechnology* 2007, 18, 195603.

(16) P. Somani and S. Radhakrishnan, "Electrochromic Response in Polypyrrole Sensitized by Prussian Blue", *Chemical Physics Letters* 1998, 292, 218-222.

(17) D. M. DeLongchamp and P. T. Hammond, "Multiple-Color Electrochromism from Layer-by-Layer-Assembled Polyaniline/Prussian Blue Nanocomposite Thin Films", *Chemistry of Materials* 2004, 16, 4799-4805.

(18) S. Duluard, A. Celik-Cochet, I. Saadeddin, A. Labouret, G. Campet, G. Schottner, U. Posset, and M-H. Delville, "Electrochromic Devices Based on in situ Polymerised EDOT and Prussian Blue: Influence of Transparent Conducting Oxide and Electrolyte Composition-Towards Up-Scaling", *New Journal of Chemistry* 2011, 35, 2314-2321.

(19) A. Curulli, F. Valentini, S. Orlanduci, M. L. Terranova, and G. Palleschi, "Pt Based Enzyme Electrode Probes Assembled with Prussian Blue and Conducting Polymer Nanostructures", *Biosensors and Bioelectronics* 2004, 20, 1223-1232.

(20) A. Ernst, O. Makowski, B. Kowalewska, K. Miecznikowski, and P. J. Kulesza, "Hybrid Bioelectrocatalyst for Hydrogen Peroxide Reduction: Immobilization of Enzyme Within Organic-Inorganic Film of Structured Prussian Blue and PEDOT", *Bioelectrochemistry* 2007, 71, 23-28.

(21) S. Lupu, P. C. Balaure, C. Lete, M. Marin, and N. Totir, "Voltammetric Determination of Dopamine at PEDOT-Prussian Blue Composite Modified Electrodes", *Revue Roumaine de Chimie* 2008, 53, 931-939.

(22) Y. Miao and J. Liu, "Assembly and Electroanalytical Performance of Prussian Blue/Polypyrrole Composite Nanoparticles Synthesized by the Reverse Micelle Method", *Science and Technology of Advanced Materials* 2009, 10, 025001.

It would be advantageous if the performance of TMHCM materials in alkali and/or alkaline earth batteries could be improved through the integration of conductive polymers.

SUMMARY OF THE INVENTION

Described herein is a technology relevant to the integration of transition metal hexacyanometallate (TMHCM)-conductive polymer (CP) composites, represented as $A_xM1M2(CN)_6$—CP composite battery electrodes. M1 and M2 may be the same or different transition metal ions derived from Ti, Cr, Mn, Fe, Co, Ni, Cu, and Zn, with their ratio being an arbitrary number, and A may be an alkali metal ion such as $Na^+$ or $K^+$, alkaline earth metal ion such as $Mg^{2+}$ or $Ca^{2+}$, ammonium ($NH_4^+$), or combinations thereof, through which the conductive polymer functionally complements the performance of the TMHCM. Also described is a strategy for fabricating composites and composite battery electrodes of transition metal hexacyanometallates ($A_xM_1M_2(CN)_6$) and conductive polymer(s).

As proof of concept, $Na_2MnFe(CN)_6$-conductive polymer (CP) composites were fabricated using $Na_2MnFe(CN)_6$ and either a "doped" polypyrrole (Ppy) or undoped polyaniline (PANI). In one case, $Na_2MnFe(CN)_6$—CP composites were prepared with either Ppy or PANI through a mechanical mixing/grinding process using a small amount of organic solvent as processing aid. As an alternative, a $Na_2MnFe(CN)_6$-Ppy composite was prepared in situ by directly synthesizing $Na_2MnFe(CN)_6$ in the presence of a colloidal suspension of "doped" Ppy.

In general, the $A_xM_1M_2(CN)_6$—CP composites may be prepared by three independent routes according to the following:

(1) Fabrication of $A_xM_1M_2(CN)_6$—CP composites by blending $A_xM_1M_2(CN)_6$ material with a conductive polymer, which may be carried out by grinding/mixing the materials and/or coating the $A_xM_1M_2(CN)_6$ with CP by conventional methods, with/without the use of processing aid (such as solvent).

(2) Directly synthesizing the $A_xM_1M_2(CN)_6$ material in the presence of a colloidal suspension of conductive polymer in a matrix (solvent) to form $A_xM_1M_2(CN)_6$—CP composites.

(3) Preparing the $A_xM_1M_2(CN)_6$—CP composites by polymerizing the respective monomer units of the conductive polymer in the presence of $A_xM_1M_2(CN)_6$ dispersed in the same matrix (solvent) and for which the polymerization is carried out using chemical methods.

Within the context of practical application as a battery technology, the strategy is amenable to sodium, potassium, magnesium, and calcium battery with positive or negative electrodes consisting of $A_xM_1M_2(CN)_6$—CP composite. Otherwise, the negative (anode) electrodes may consist of metal, metal alloy, non-metal material, and/or polymer material. An ion-permeable membrane is interposed between (separating) the cathode and anode. In general, the ion-permeable membrane functions as a physical spacer that separates anode from cathode while, at the same time, permits migration of ions between anode and cathode. In many cases, the ion permeable membrane is a polymeric material although solid and/or ceramic ion-permeable membranes are also appropriate. An electrolyte system is employed to transportions between the anode and cathode though the ion-permeable membrane. In some cases, the electrolyte and ion-permeable membrane (separator) are the same material. When the anode is a non-metal, it may consist of carbonaceous materials, oxides, sulfides or nitrides, organic polymers, etc., and is referred to an alkali-ion or alkaline earth-ion battery. In order to achieve a high voltage for the battery, non-aqueous electrolytes, such as organic electrolyte, gel electrolyte, polymer electrolyte, solid electrolyte, etc. is/are preferably employed, although aqueous electrolyte systems are compatible with the $A_xM_1M_2(CN)_6$—CP composites described herein.

Accordingly, a TMHCM-CP composite electrode is provided. The battery electrode is made up of a current collector and a transition metal hexacyanometallate-conductive polymer composite overlying the current collector. The transition metal hexacyanometallate-conductive polymer includes a $A_XM1_YM2_Z(CN)_N.MH_2O$ material, where A may be alkali metal ions, alkaline earth metal ions, ammonium ions, or combinations thereof. M1 is a first transition metal ion, and M2 is a second transition metal ion. The variable ranges are as follows:

X is in the range of 0 to 2;

Y is in the range of 0 to 2;

Z is in the range of 0.1 to 2;

N is in the range of 1 to 6; and,

M is in the range of 0 to 7.

The transition metal hexacyanometallate-conductive polymer composite also includes a conductive polymer material. In one aspect, the conductive polymer material is polyaniline (PANI) or polypyrrole (Ppy).

Also presented herein are methods for the fabrication of a TMHCM-CP composite. One method provides a $A_XM1_YM2_Z(CN)_N.MH_2O$ material as described above. The method mixes the $A_XM1_YM2_Z(CN)_N.MH_2O$ material with a CP material, with or without a solvent, to form a $A_XM1M2(CN)_6$—CP composite.

Additional details of the above-described TMHCM-CP battery electrode, a TMHCM-CP composite material, and associated fabrication methods are presented below.

DETAILED DESCRIPTION

Figure 1:
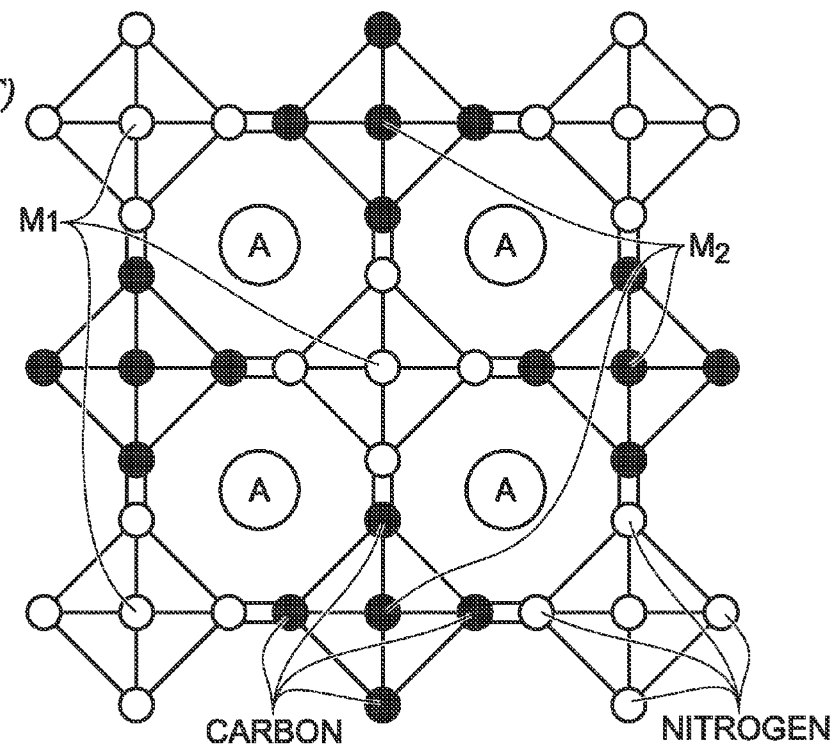
FIG. 1 is a schematic diagram depicting the framework of $A_xM_1M_2(CN)_6$ (prior art).

FIGS. 2A through 2E are cross-sectional views depicting variations of a transition metal hexacyanometallate (TMHCM)-conductive polymer (CP) composite. The TMHCM-CP composite 200 comprises a $A_XM1_YM2_Z(CN)_N{\cdot}MH_2O$ material 202, where A may be alkali metal ions, alkaline earth metal ions, ammonium ions, or combinations thereof. M1 is a first transition metal ion, and M2 is a second transition metal ion. The variable ranges are as follows:

X is in the range of 0 to 2;

Y is in the range of 0 to 2;

Z is in the range of 0.1 to 2;

N is in the range of 1 to 6; and,

M is in the range of 0 to 7.

The TMHCM-CP composite 200 also comprises a conductive polymer (CP) material 204.

Transition metals are defined herein as elements whose atoms possess an incomplete d sub-shell or can give rise to cations (transition metal ions) with an incomplete d shell and include Groups 3 to 12 of the Periodic Table. Alkali metals include elements in Group 1 of the Periodic Table and exhibit a tendency to form ions with a single positive charge (alkali metal ions) through loss of an electron. The alkali metals include lithium (Li), sodium (Na), potassium (K), rubidium (Rb), cesium (Cs), and francium (Fr). Alkaline earth metals include those elements in Group 2 of the Periodic Table and which readily lose two electrons to form cations with a 2+ charge. The alkaline earth metals include beryllium (Be), magnesium (Mg), calcium (Ca), strontium (Sr), barium (Ba), and radium (Ra).

In one aspect, the conductive polymer material 204 is either polyaniline (PANI) or polypyrrole (Ppy). The conductive polymer (CP) may be in either a doped or undoped form, including combinations thereof. As used herein, a "doped" form of a CP refers to a highly conductive state for a polymer that is accessible through several methods including, but not limited to, chemical and/or electrochemical doping. For example, "doped" forms of Ppy can be formed through addition of acids to provide conductivity that is several orders of magnitude higher relative to the "undoped" species. In many cases, organic acids are employed for this purpose although many alternatives are available. Similarly, PANI in its emeraldine base form can be converted to a protonated and highly conductive "doped" species through addition of various protic acids.

Some examples of A ions include lithium ($Li^+$), sodium ($Na^+$), potassium ($K^+$), rubidium ($Rb^+$), cesium ($Cs^+$), calcium ($Ca^{2+}$), magnesium ($Mg^{2+}$), and ammonium ($NH_4^+$). As used herein, ammonium ($NH_4^+$) refers to a positively charged ion (cation) that is formed by protonation of ammonia, or stated alternatively, represents the species formed from the reaction of ammonia with protic acids. The first and second transition metal ions M1 and M2 are each independently derived (e.g., need not necessarily be the same material), and include transition metals such as titanium (Ti), chromium (Cr), manganese (Mn), iron (Fe), cobalt (Co), nickel (Ni), copper (Cu), and zinc (Zn).

Figure 2A:
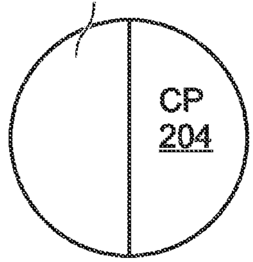
FIGS. 2A through 2E are cross-sectional views depicting variations of a transition metal hexacyanometallate (TMHCM)-conductive polymer (CP) composite.
Figure 2B:
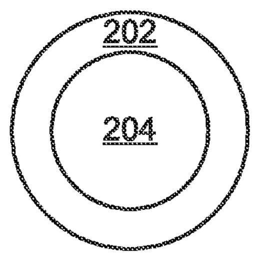
Figure 2C:
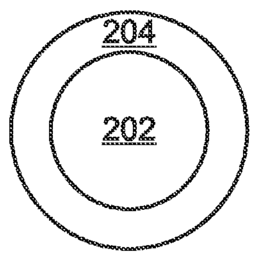
Figure 2D:
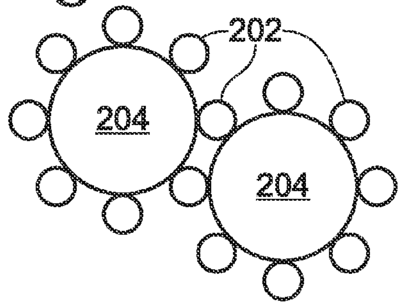
Figure 2E:
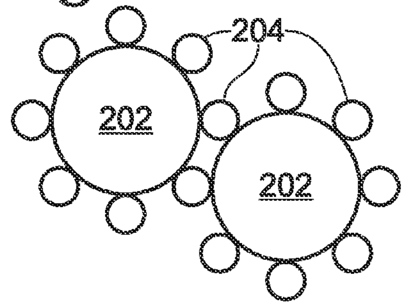

FIG. 2A represents a composite of $A_XM1_YM2_Z(CN)_N{\cdot}MH_2O$ material 202 and CP 204. In FIG. 2B $A_XM1_YM2_Z(CN)_N{\cdot}MH_2O$ material 202 coats or covers CP 204. In FIG. 2C CP 204 coats or covers the $A_XM1_YM2_Z(CN)_N{\cdot}MH_2O$ material 202. In FIG. 2D $A_XM1_YM2_Z(CN)_N{\cdot}MH_2O$ material particles 202 are formed on a CP structure 204. In FIG. 2E CP particles 204 are formed on a $A_XM1_YM2_Z(CN)_N{\cdot}MH_2O$ material structure 202.

Figure 3:
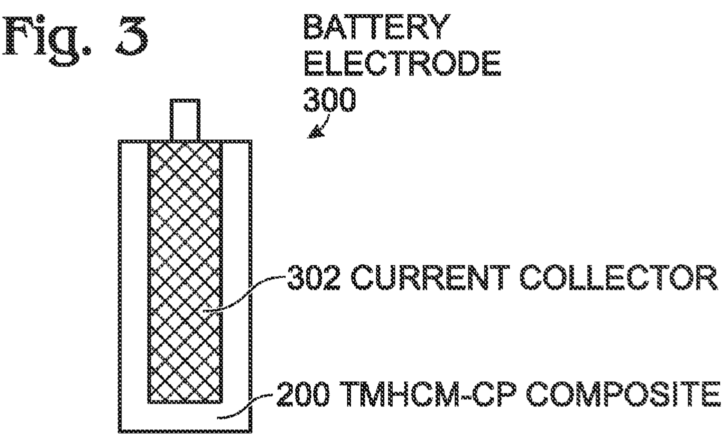
FIG. 3 is a partial cross-sectional view of a TMHCM-CP composite battery electrode.

FIG. 3 is a partial cross-sectional view of a TMHCM-CP composite battery electrode. The battery electrode 300 comprises a current collector 302, typically made of an electrically conductive metal such as copper or aluminum. A transition metal hexacyanometallate-conductive polymer (TMHCM-CP) composite 200 overlies the current collector 302. As explained above in the description of FIG. 2, the TMHCM-CP composite material 200 is comprised of a $A_XM1_YM2_Z(CN)_N{\cdot}MH_2O$ material (202, see FIG. 2) and a conductive polymer material (204, see FIG. 2). Details of the TMHCM-CP 200 have been provided above and are not repeated here in the interest of brevity. As would be understood by those with ordinary skill in the art, the battery electrode 300 may also include a conductor (not shown), such as a carbonaceous material including carbon black, carbon nanotubes, carbon fibers, etc., to improve electrical conductivity between the TMHCM-CP material 200, and between the TMHCM-CP material 200 and the current collector 302. The battery electrode 300 may also include a polymeric binder (not shown), such as polytetrafluoroethylene (PTFE) or polyvinylidene difluoride (PVDF) to provide adhesion between electrode components/current collector and improve the overall physical stability and form of the battery electrode.

Figure 4A:
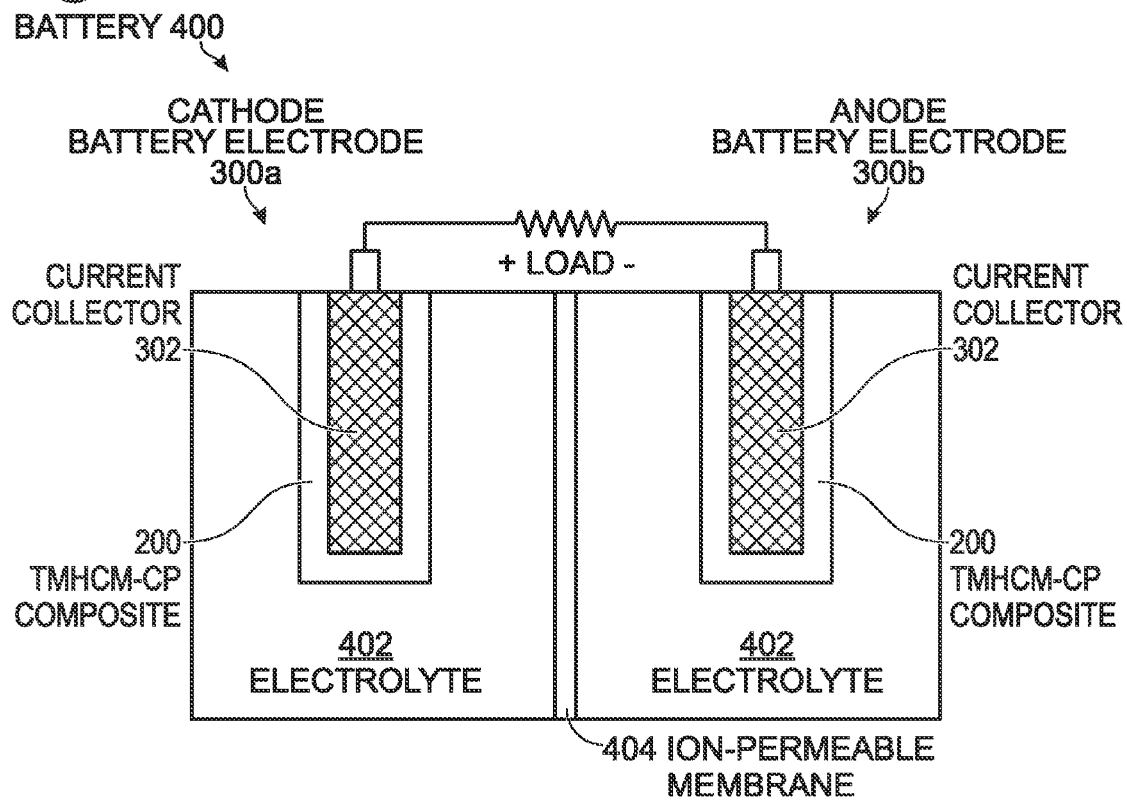
FIGS. 4A and 4B are partial cross-sectional views of batteries employing the battery electrode of FIG. 3.
Figure 4B:
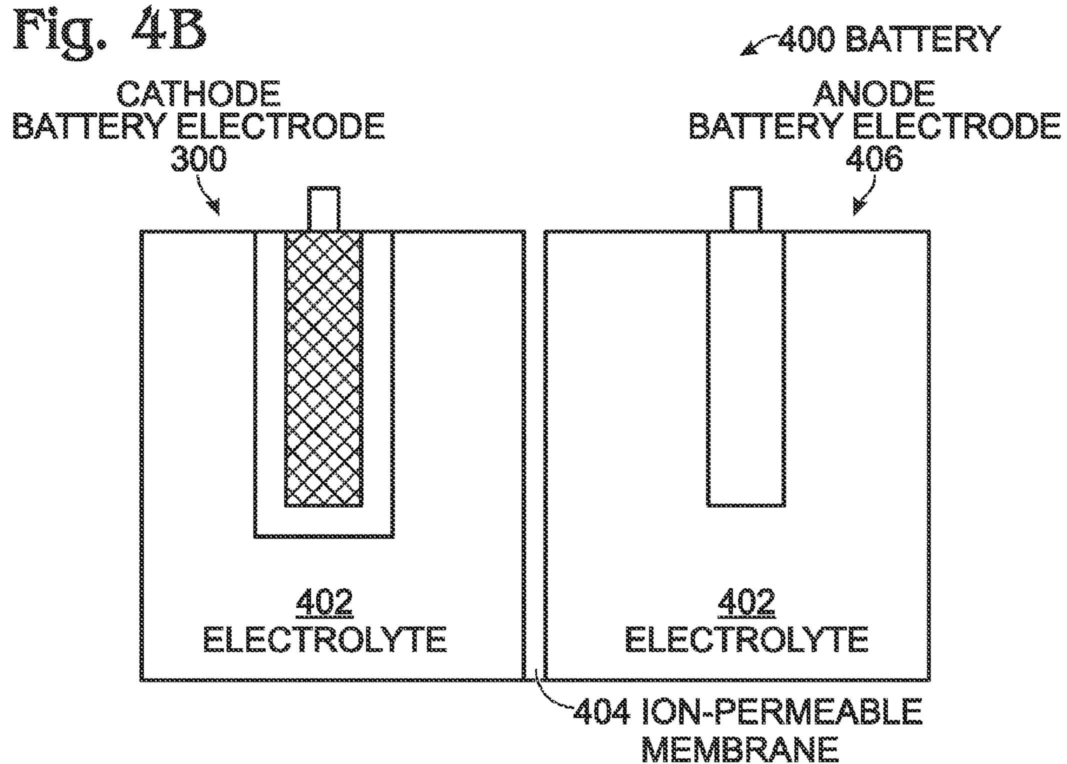

FIGS. 4A and 4B are partial cross-sectional views of batteries employing the battery electrode of FIG. 3. The battery 400 comprises a cathode (positive) battery electrode 300*a*, an electrolyte 402, and an anode (negative) battery electrode 300*b*. In FIG. 4A, the cathode battery electrode 300*a* and the anode battery electrode 300*b* are both made from TMHCM-CP composite materials 200 overlying current collectors 302, as described above. However, the cathode battery electrode 300*a* need not necessarily be made from the identical materials as the anode battery electrode 300*b*. The electrolyte 402 may be non-aqueous, such as an organic liquid electrolyte, or alternatively, gel electrolyte, polymer electrolyte, solid (inorganic) electrolyte, etc. Common examples of non-aqueous (liquid) electrolytes include organic carbonates such as ethylene carbonate (EC), propylene carbonate (PC), diethyl carbonate (DEC), etc., although many other organic carbonates and alternatives to organic carbonates exist. Typically, gel electrolytes consist of polymeric materials which have been swelled in the presence of non-aqueous (liquid) electrolytes. Examples of polymers employed as gel electrolytes include, but are not limited to, poly(ethylene)oxide (PEO) and fluorinated polymers such as poly(vinylidene) fluoride (PVDF)-based polymers and copolymers, etc. In contrast, (solid) polymer electrolytes may be prepared using the same classes of polymers for forming gel electrolytes although swelling of the polymer in liquid electrolytes is excluded. Finally, solid inorganic (or ceramic) materials may be considered as electrolytes, which may be employed in combination with liquid-based electrolytes. Overall, the appropriate electrolyte system may consist of combinations (hybrid) of the above classes of materials in a variety of configurations. Otherwise, an aqueous electrolyte compatible with the $A_xM_1M_2(CN)_6$—CP composites may be used. An ion-permeable membrane 404 is interposed between the cathode 300*a* and the anode 300*b*. In some instances not shown, the ion-permeable membrane and the electrolyte can be the same material as may be the case for polymer gel, polymer, and (solid) inorganic electrolytes.

In FIG. 4B, the battery 400 comprises a cathode battery electrode 300 made from a TMHCM-CP composite material, as described above. The anode battery electrode 406 in this case may be a metal, metal alloy, non-metal material, and/or polymer material. The electrolyte 402 may be non-aqueous, gel, polymer, solid organic, or aqueous. An ion-permeable membrane 404 is interposed between the cathode electrode 300 and anode electrode 406. Similarly, the ion-permeable membrane and the electrolyte can be the same material as may be the case for polymer gel, polymer and (solid) inorganic electrolytes.

In the following section are provided the experimental details, scientific investigation, and corresponding performance data for $A_xM_1M_2(CN)_6$-conductive polymer composites within the context of battery applications.

Proof of Concept Demonstration:

$Na_2MnFe(CN)_6$-Ppy(1): a pristine sample of $Na_2MnFe(CN)_6$ was used to fabricate a $Na_2MnFe(CN)_6$-polypyrrole (Ppy) composite. $Na_2MnFe(CN)_6$-Ppy(1) was prepared by intimately grinding $Na_2MnFe(CN)_6$ with a "doped" form of Ppy in the presence of N,N-dimethylformamide (DMF) followed by drying under vacuum at 120° C. The $Na_2MnFe(CN)_6$-Ppy composition included Ppy at 20 weight percent (wt %) relative to $Na_2MnFe(CN)_6$. As a control sample, pristine $Na_2MnFe(CN)_6$ was ground and similarly dried under vacuum at 120° C. Note: the PW-Ppy(1) composite was prepared from the identical batch of $Na_2MnFe(CN)_6$ material used to fabricate a control battery.

$Na_2MnFe(CN)_6$-Ppy(2): involved synthesizing a $Na_2MnFe(CN)_6$-Ppy composite material wherein $Na_2MnFe(CN)_6$ was prepared using a precipitation process in the presence of a colloidal suspension of "doped" Ppy. The process for $Na_2MnFe(CN)_6$-Ppy(2) was identical to that for synthesizing $Na_2MnFe(CN)_6$ with the exception that the $Na_2MnFe(CN)_6$ material was prepared in the presence of Ppy so that the $Na_2MnFe(CN)_6$-Ppy composite was formed in a single step during precipitation, rather than sequentially (synthesis of $Na_2MnFe(CN)_6$ followed by mixing with CP), as described for $Na_2MnFe(CN)_6$-Ppy(1).

$Na_2MnFe(CN)_6$—PANI: a pristine sample of $Na_2MnFe(CN)_6$ was used to fabricate a $Na_2MnFe(CN)_6$-polyaniline (PANI) composite ($Na_2MnFe(CN)_6$—PANI). $Na_2MnFe(CN)_6$—PANI was prepared by intimately grinding $Na_2MnFe(CN)_6$ with PANI (emeraldine base form) in the presence of DMF followed by drying under vacuum at 120° C. The $Na_2MnFe(CN)_6$—PANI composition included PANI at 20 wt % relative to $Na_2MnFe(CN)_6$. For a control sample, pristine $Na_2MnFe(CN)_6$ was ground and similarly dried under vacuum at 120° C. Note: the $Na_2MnFe(CN)_6$-PANI composite was prepared from the identical batch of $Na_2MnFe(CN)_6$ material used to fabricate a control battery.

Cathode ($Na_2MnFe(CN)_6$, $Na_2MnFe(CN)$-Ppy(1), $Na_2MnFe(CN)_6$-Ppy(2), and $Na_2MnFe(CN)_6$—PANI): consisted of $Na_2MnFe(CN)_6$ or $Na_2MnFe(CN)_6$— conductive polymer composites (70 wt %), carbon black (20 wt %), and PTFE (10 wt %) as binder.

Sodium battery: prototypes were fabricated in a "coin cell" configuration with a sodium metal ($Na^0$) anode, polymeric membrane (separator), and sodium perchlorate ($NaClO_4$) in EC/DEC (1:1) as electrolyte with $Na_2MnFe(CN)_6$, $Na_2MnFe(CN)_6$-Ppy(1), $Na_2MnFe(CN)_6$-Ppy(2), or $Na_2MnFe(CN)_6$—PANI composite cathode. A coin cell consists of a small metal canister that forms the body and positive terminal of the battery along with an insulated top cap that serves as the negative terminal. Typically, anode, separator (ion-permeable membrane), cathode and electrolyte are loaded into the coin cell which is subsequently sealed ("crimped") under applied force/pressure. Commercial coin/button cells are used to power small, portable electronic devices including watches, calculators, keyless entry systems, etc.

Figure 5:
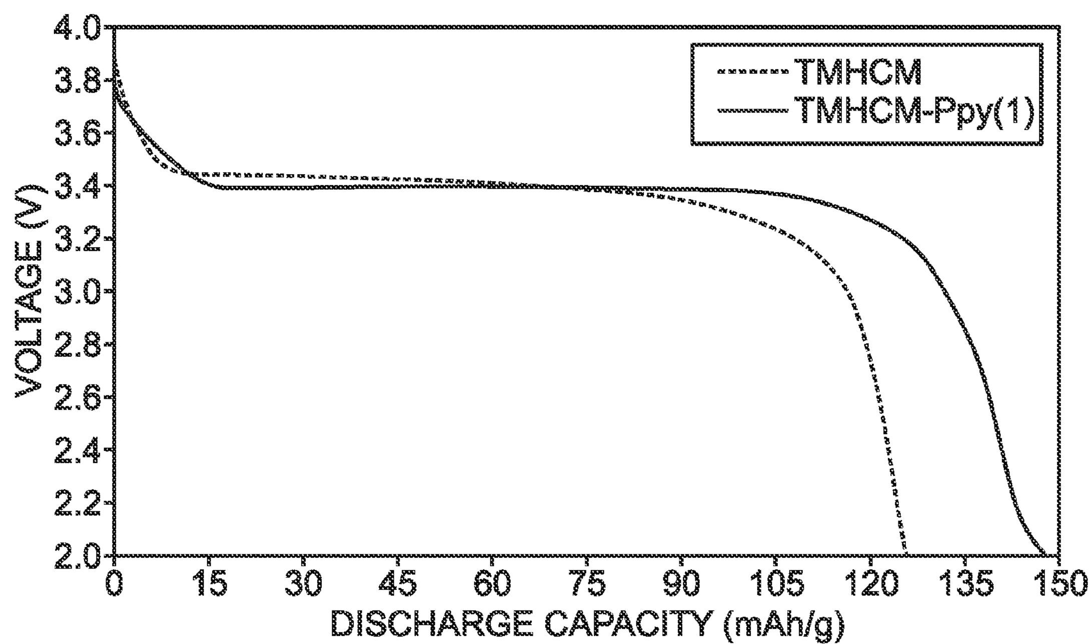
FIG. 5 is a graph depicting first discharge curves for batteries with either $Na_2MnFe(CN)_6$ or $Na_2MnFe(CN)_6$-Ppy composite ($Na_2MnFe(CN)_6$-Ppy(1)) cathodes cycled at a current density of 10 milliamps per gram (mA/g) between 2.0 V and 4.0 V [y-axis: voltage in volts (V); x-axis: discharge capacity in mAh/g].

FIG. 5 is a graph depicting first discharge curves for batteries with either $Na_2MnFe(CN)_6$ or $Na_2MnFe(CN)_6$-Ppy composite ($Na_2MnFe(CN)_6$-Ppy(1)) cathodes cycled at a current density of 10 milliamp per gram (mA/g) between 2.0 V and 4.0 V [y-axis: voltage in volts (V); x-axis: discharge capacity in mAh/g]. As can be discerned from the curves in FIG. 5, the initial discharge capacity for the battery with the $Na_2MnFe(CN)_6$-Ppy(1) cathode (~147.9 mAh/g) is greater than that of pristine $Na_2MnFe(CN)_6$ (~125.7 mAh/g). Since it was previously determined that the pristine ("doped") Ppy provided ~40 mAh/g discharge capacity at a current density of 10 mA/g in a sodium battery employing a sodium metal ($Na^0$) anode, the >20 mAh/g capacity difference between $Na_2MnFe(CN)_6$-Ppy(1) and $Na_2MnFe(CN)_6$ (control) batteries cannot reasonably be attributed to independent contributions from Ppy to the discharge capacity of the $Na_2MnFe(CN)_6$-Ppy(1) composite cathode.

Figure 6:
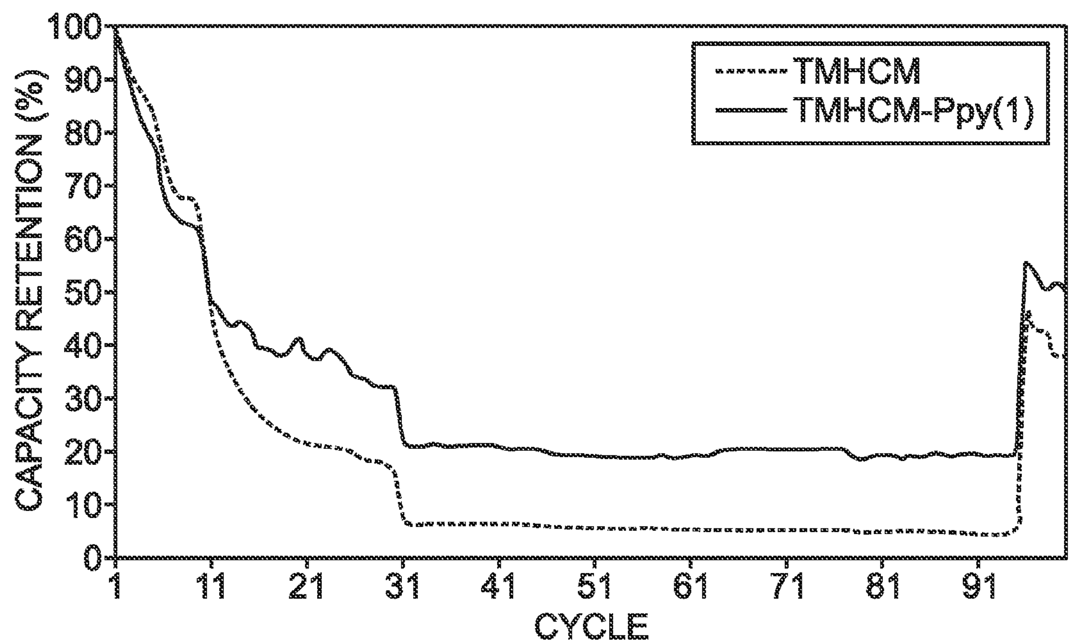
FIG. 6 is a graph depicting the percent (%) discharge capacity retention (relative to initial discharge capacity) versus cycle number for batteries with either $Na_2MnFe(CN)_6$ or $Na_2MnFe(CN)_6$-Ppy(1) composite cathodes cycled sequentially according to the following profile: 10 mA/g (5 cycles)→20 mA/g (5 cycles)→50 mA/g (20 cycles)→100 mA/g (65-cycles)→10 mA/g (5 cycles) between 2.0 V and 4.0 V [y-axis: percent (%) capacity retention; x-axis: cycle number].

FIG. 6 is a graph depicting the percent (%) discharge capacity retention (relative to initial discharge capacity) versus cycle number for batteries with either $Na_2MnFe(CN)_6$ or $Na_2MnFe(CN)_6$-Ppy(1) composite cathodes cycled sequentially according to the following profile: 10 mA/g (5 cycles)→20 mA/g (5 cycles)→50 mA/g (20 cycles)→100 mA/g (65 cycles)→10 mA/g (5 cycles) between 2.0 V and 4.0 V [y-axis: percent (%) capacity retention; x-axis: cycle number]. As can be seen from the figure, the % discharge capacity retention (versus initial discharge capacity) is higher for $Na_2MnFe(CN)_6$-Ppy(1) than for $Na_2MnFe(CN)_6$ (no Ppy), particularly in the higher current density regime corresponding to 50 mA/g (cycles 11 through 30) and 100 mA/g (cycles 31 through 95). Based upon the % capacity retention data, it appears as though Ppy is indeed effective at preserving discharge capacity at both moderate (50 mA/g) and higher (100 mA/g) current densities.

Figure 7:
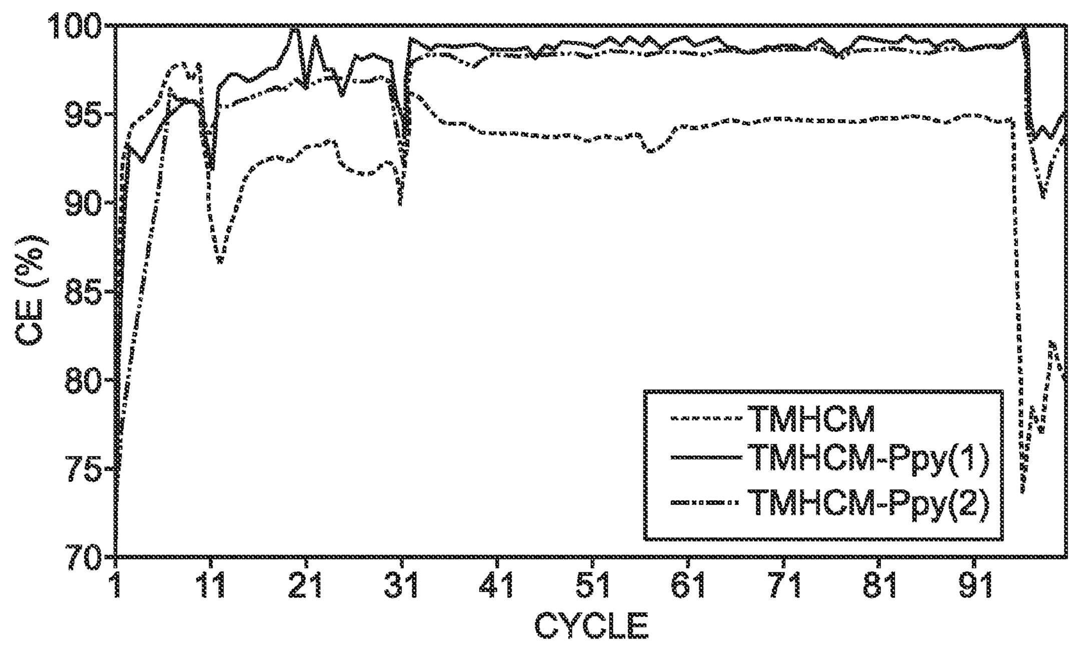
FIG. 7 is a graph depicting coulombic efficiency (CE %) versus cycle number for batteries with $Na_2MnFe(CN)_6$, $Na_2MnFe(CN)_6$-Ppy(1) composite, and $Na_2MnFe(CN)_6$-Ppy (2) composite cathodes cycled sequentially according to the following profile: 10 mA/g (5 cycles)→20 mA/g (5 cycles)→50 mA/g (20 cycles)→100 mA/g (65 cycles)→10 mA/g (5 cycles) between 2.0 V and 4.0 V [y-axis: coulombic efficiency (CE %); x-axis: cycle number].

FIG. 7 is a graph depicting coulombic efficiency (CE %) versus cycle number for batteries with $Na_2MnFe(CN)_6$, $Na_2MnFe(CN)_6$-Ppy(1) composite, and $Na_2MnFe(CN)_6$-Ppy(2) composite cathodes cycled sequentially according to the following profile: 10 mA/g (5 cycles)→20 mA/g (5 cycles)

→50 mA/g (20 cycles)→100 mA/g (65 cycles)→10 mA/g (5 cycles) between 2.0 V and 4.0 V [y-axis: coulombic efficiency (CE %); x-axis: cycle number]. The advantageous impact of Ppy in the $Na_2MnFe(CN)_6$-Ppy composite electrodes is further supported by the data in the figure, from which it is clear that higher coulombic efficiencies are achieved for $Na_2MnFe(CN)_6$ in the presence of Ppy (such as indicated for $Na_2MnFe(CN)_6$-Ppy(1) and $Na_2MnFe(CN)_6$-Ppy(2) compared to $Na_2MnFe(CN)_6$), which is likely attributed, at least in part, to improved electrode conductivity which, in turn, provides $Na_2MnFe(CN)_6$ tolerance at higher current densities.

Figure 8:
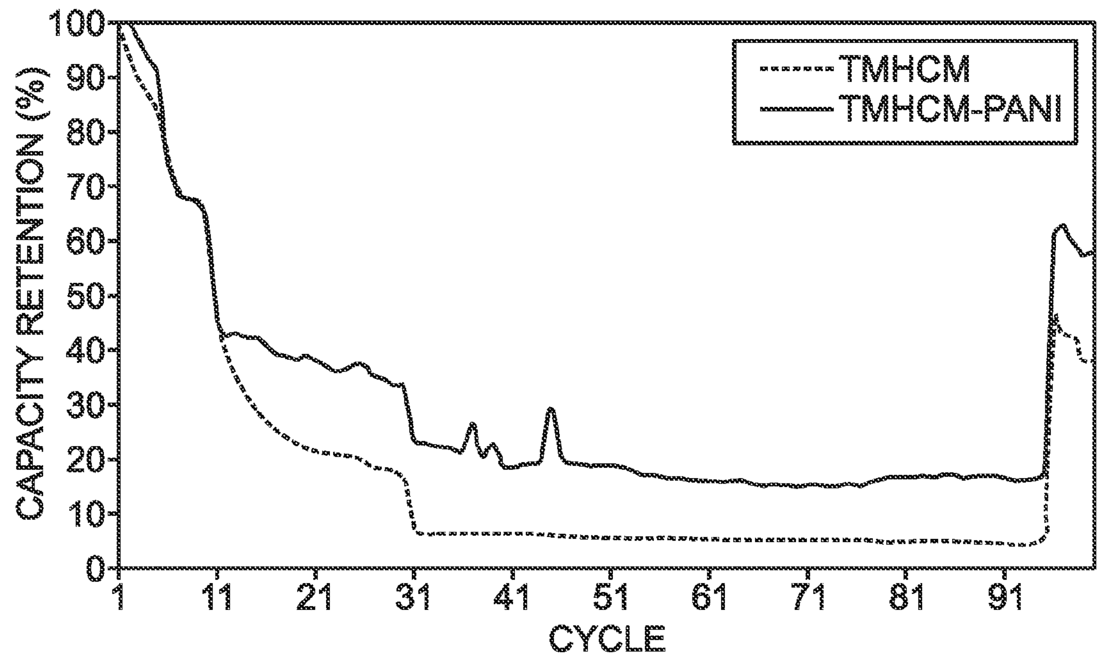
FIG. 8 is a graph depicting percent (%) discharge capacity retention (relative to initial discharge capacity) versus cycle number for batteries with either $Na_2MnFe(CN)_6$ or $Na_2MnFe(CN)_6$—PANI composite cathodes cycled sequentially according to the following profile: 10 mA/g (5 cycles)→20 mA/g (5 cycles)→50 mA/g (20 cycles)→100 mA/g (65 cycles)→10 mA/g (5 cycles) between 2.0 V and 4.0 V [y-axis: percent (%) capacity retention; x-axis: cycle number].

FIG. 8 is a graph depicting percent (%) discharge capacity retention (relative to initial discharge capacity) versus cycle number for batteries with either $Na_2MnFe(CN)_6$ or $Na_2MnFe(CN)_6$—PANI composite cathodes cycled sequentially according to the following profile: 10 mA/g (5 cycles)→20 mA/g (5 cycles)→50 mA/g (20 cycles)→100 mA/g (65 cycles)→10 mA/g (5 cycles) between 2.0 V and 4.0 V [y-axis: percent (%) capacity retention; x-axis: cycle number]. As can be seen from the figure, a higher % discharge capacity retention (versus initial capacity) is observed for the $Na_2MnFe(CN)_6$—PANI composite relative to pristine $Na_2MnFe(CN)_6$ cathode along current intervals corresponding to 50 and 100 mA/g. Furthermore, the final % discharge capacity retention for the $Na_2MnFe(CN)_6$—PANI is approximately 20% higher than pristine $Na_2MnFe(CN)_6$ following 100 cycles. Finally, coulombic efficiencies (CE %)>97% for $Na_2MnFe(CN)_6$—PANI composite cathodes were slightly better than $Na_2MnFe(CN)_6$ electrodes (~94%) at a current density of 100 mA/g (not shown).

Overall, the beneficial impact from integration of conductive polymers (CP) for fabricating $A_XM_1M_2(CN)_6$—CP composite electrodes has been unambiguously demonstrated, with improved capacity retention and higher coulombic efficiency (with either Ppy or PANI as representative CPs) versus $Na_2MnFe(CN)_6$ (control) as a representative transition metal hexacyanometallate ($A_XM_1M_2(CN)_6$) in sodium batteries. The rationale, methods, and experimental data have been provided to support the assertion that $A_XM_1M_2(CN)_6$—CP composites represent a practical, "enabling" technology for improving the performance of transition metal hexacyanometallate electrodes in battery applications.

Figure 9:
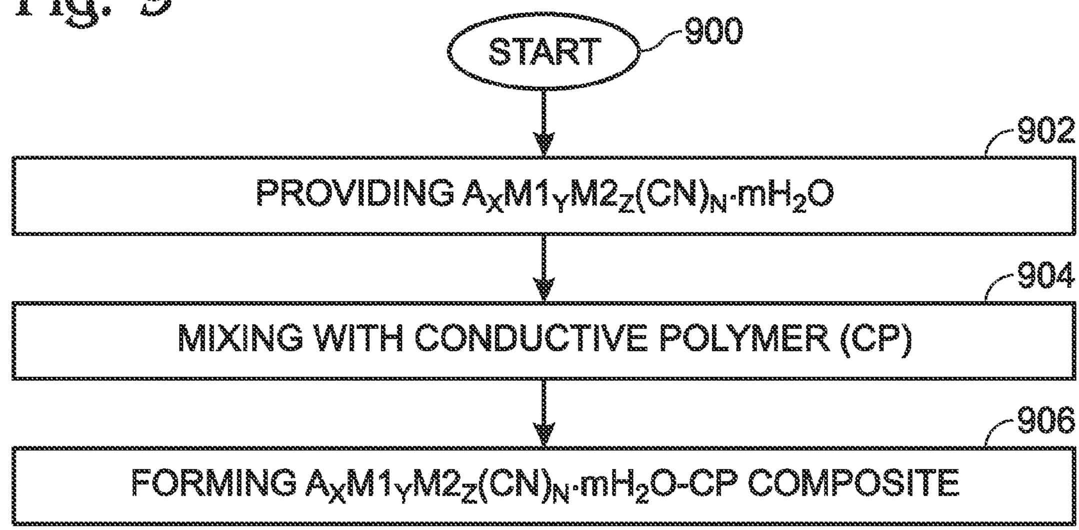
FIG. 9 is a flowchart illustrating a method for the fabrication of a TMHCM-CP composite.

FIG. 9 is a flowchart illustrating a method for the fabrication of a TMHCM-CP composite. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 900.

Step 902 provides a $A_XM1_YM2_Z(CN)_N{\cdot}MH_2O$ material, where A may be alkali metal ions, alkaline earth metal ions, ammonium ions, or combinations thereof. M1 is a first transition metal ion, and M2 is a second transition metal ion. In general, the chemical source(s) for the transition metal ions M1 and M2 used for synthesizing TMHCM materials typically include materials such as ionic salts of transition metal ions and/or transition metal complexes, although other possibilities exist. The variables are defined as follows:

X is in the range of 0 to 2;
Y is in the range of 0 to 2;
Z is in the range of 0.1 to 2;
N is in the range of 1 to 6; and,
M is in the range of 0 to 7.

Step 904 mixes the $A_XM1_YM2_Z(CN)_N{\cdot}MH_2O$ material with a CP material. Step 906 forms a $A_XM1_YM2_Z(CN)_N{\cdot}MH_2O$—CP composite. For example, the CP material may be PANI or Ppy. In one aspect, Step 904 mixes the $A_XM1_YM2_Z(CN)_N{\cdot}MH_2O$ material with the CP material in the presence of a solvent.

The A ions of Step 902 may be lithium ($Li^+$), sodium ($Na^+$), potassium ($K^+$), rubidium ($Rb^+$), cesium ($Cs^+$), calcium ($Ca^{2+}$), magnesium ($Mg^{2+}$), or ammonium ($NH_4^+$). The first and second transition metal ions M1 and M2 of Step 902 are each independently derived, meaning that M1 and M2 may be the same or different materials, from one of the following: titanium (Ti), chromium (Cr), manganese (Mn), iron (Fe), cobalt (Co), nickel (Ni), copper (Cu), or (Zn).

Figure 10:
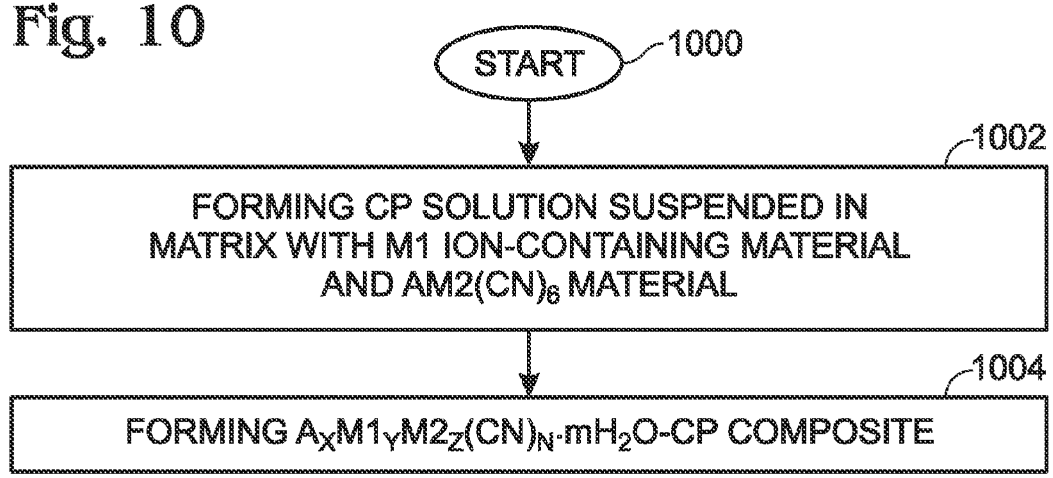
FIG. 10 is a flowchart illustrating a first variation in the method for the fabrication of a TMHCM-CP composite.

FIG. 10 is a flowchart illustrating a first variation in the method for the fabrication of a TMHCM-CP composite. The method begins at Step 1000. Step 1002 forms a solution of CP material suspended in a matrix with a first transition metal M1 ion-containing material and a $AM2(CN)_6$ material, where A may be alkali metal ions, alkaline earth metal ions, ammonium ions, or combinations thereof. M1 is a first transition metal ion, and M2 is a second transition metal ion. Step 1004 forms a $A_XM1_YM2_Z(CN)_N{\cdot}MH_2O$—CP composite, where:

X is in the range of 0 to 2;
Y is in the range of 0 to 2;
Z is in the range of 0.1 to 2;
N is in the range of 1 to 6; and,
M is in the range of 0 to 7.

The CP material may be PANI or Ppy. M1 and M2 are each being independently derived, meaning that M1 and M2 may be the same of different materials, and may be transition metal ions of Ti, Cr, Mn, Fe, Co, Ni, Cu, or Zn.

Figure 11:
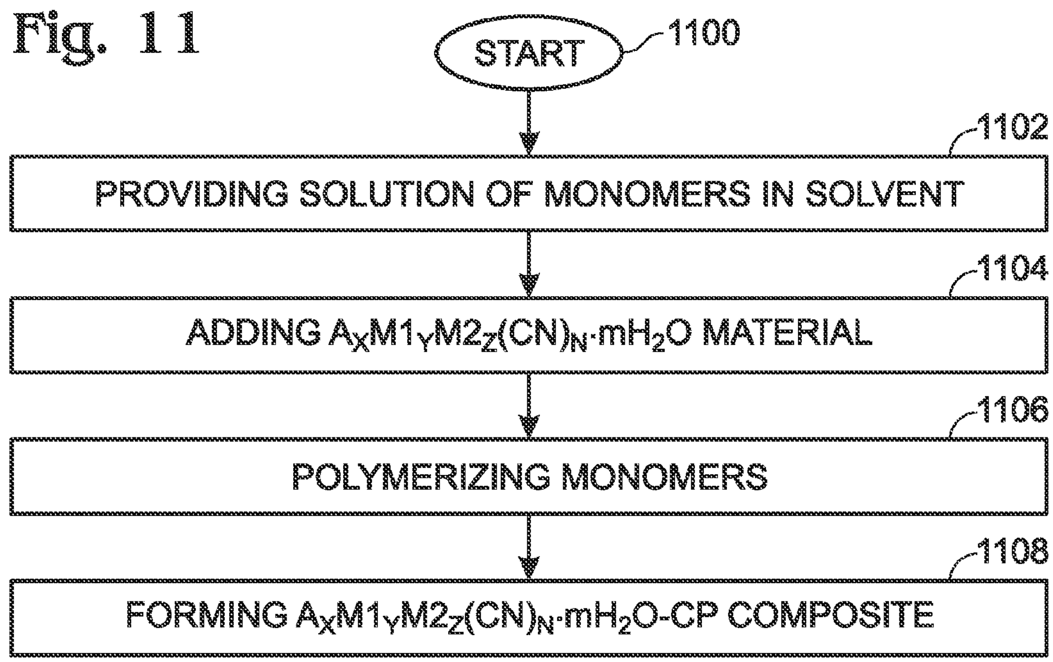
FIG. 11 is a flowchart illustrating a second variation in the method for the fabrication of a TMHCM-CP composite.

FIG. 11 is a flowchart illustrating a second variation in the method for the fabrication of a TMHCM-CP composite. The method begins at Step 1100. Step 1102 provides a solution of monomers suspended in a solvent. As used herein, "monomer" refers to the individual chemical units from which the conductive polymer (CP) is formed during polymerization. Stated alternatively, the conductive polymer consists of individual monomer units joined together. In one aspect, the monomers may be aniline or pyrrole, including derivatives thereof. In other words, the monomers may be modified (functionalized) with various chemical groups. Therefore, the resulting polymer formed via polymerization of the monomers is represented as repeating units of the particular monomer, whether it be polyaniline (from aniline monomers), polypyrrole (from pyrrole monomers), functionalized polyaniline (from functionalized aniline monomers), or functionalized polypyrrole (from functionalized pyrrole monomers).

Step 1104 adds a $A_XM1_YM2_Z(CN)_N{\cdot}MH_2O$ material to the solution, where A may be alkali metal ions, alkaline earth metal ions, ammonium ions, or combinations thereof. M1 is a first transition metal ion, and M2 is a second transition metal ion. The range of variables is as follows:

X is in the range of 0 to 2;
Y is in the range of 0 to 2;
Z is in the range of 0.1 to 2;
N is in the range of 1 to 6; and,
M is in the range of 0 to 7.

Step 1106 polymerizes the monomers. Step 1108 forms a $A_XM_1M2_Z(CN)_N{\cdot}MH_2O$—CP composite.

The A ions of Step 1104 may be $Li^+$, $Na^+$, $K^+$, $Rb^+$, $Cs^+$, $Ca^{2+}$, $Mg^{2+}$, or $NH_4^+$. M1 and M2 are each being independently derived, meaning that M1 and M2 may be the same or different materials, and may be Ti, Cr, Mn, Fe, Co, Ni, Cu, or Zn.

A TMHCM-CP composite material, TMHCM-CP composite battery electrode, and associated fabrication methods have been provided. Examples of particular materials and process steps have been presented to illustrate the invention. However, the invention is not limited to merely these examples. Other variations and embodiments of the invention will occur to those skilled in the art.

We claim:

1. A transition metal hexacyanometallate (TMHCM)-conductive polymer (CP) composite battery electrode for use in an electrochemical cell (battery) with a non-aqueous electrolyte, the battery electrode comprising:
a current collector;
a transition metal hexacyanometallate-conductive polymer composite overlying the current collector, comprising:
a $A_XM1_YM2_Z(CN)_N.MH_2O$ material;
where A is selected from a group consisting of alkali metal ions, alkaline earth metal ions, ammonium ions, and combinations thereof;
where M1 is a first transition metal ion;
where M2 is a second transition metal ion;
where X is in a range of 0 to 2;
where Y is in a range of 0 to 2;
where Z is in a range of 0.1 to 2;
where N is in a range of 1 to 6;
where M is in a range of 0 to 7;
a conductive polymer material; and,
wherein the TMHCM electrode capacity is increased in response to the conductive polymer material.

2. The battery electrode of claim 1 wherein the A ions are selected from a group consisting of lithium ($Li^+$), sodium ($Na^+$), potassium ($K^+$), rubidium ($Rb^+$), cesium ($Cs^+$), calcium ($Ca^{2+}$), magnesium ($Mg^{2+}$), and ammonium ($NH_4^+$).

3. The battery electrode of claim 1 wherein the first and second transition metal ions M1 and M2 are each independently derived, as selected from a group consisting of titanium (Ti), chromium (Cr), manganese (Mn), iron (Fe), cobalt (Co), nickel (Ni), copper (Cu), and zinc (Zn).

4. A method for the fabrication of a transition metal hexacyanometallate (TMHCM)-conductive polymer (CP) composite for use as an electrode in an electrochemical cell (battery) with a non-aqueous electrolyte, the method comprising:
providing a $A_XM1_YM2_Z(CN)_N.MH_2O$ material;
where A is selected from a group consisting of alkali metal ions, alkaline earth metal ions, ammonium ions, and combinations thereof;
where M1 is a first transition metal ion;
where M2 is a second transition metal ion;
where X is in a range of 0 to 2;
where Y is in a range of 0 to 2;
where Z is in a range of 0.1 to 2;
where N is in a range of 1 to 6;
where M is in a range of 0 to 7;
mixing the $A_XM1_YM2_Z(CN)_N.MH_2O$ material suspended in a matrix with a CP material; and,
forming a $A_XM1_YM2_Z(CN)_N.MH_2O$-CP composite.

5. The method of claim 4 wherein mixing the $A_XM1_YM2_Z(CN)_N.MH_2O$ material with the CP material includes mixing in the presence of a solvent.

6. The method of claim 4 wherein providing the $A_XM1_YM2_Z(CN)_N.MH_2O$ material includes the A ions being selected from a group consisting of lithium ($Li^+$), sodium ($Na^+$), potassium ($K^+$), rubidium ($Rb^+$), cesium ($Cs^+$), calcium ($Ca^{2+}$), magnesium ($Mg^{2+}$), and ammonium ($NH_4^+$).

7. The method of claim 4 wherein providing the $A_XM1_YM2_Z(CN)_N.MH_2O$ material includes the first and second transition metal ions M1 and M2 each being independently derived, as selected from a group consisting of titanium (Ti), chromium (Cr), manganese (Mn), iron (Fe), cobalt (Co), nickel (Ni), copper (Cu), and zinc (Zn).

8. A method for the fabrication of a transition metal hexacyanometallate (TMHCM)-conductive polymer (CP) composite, the method comprising:
forming a solution of CP material suspended in a matrix with a first transition metal M1 ion-containing material and a $AM2(CN)_6$ material:
where A is selected from a group consisting of alkali metal ions, alkaline earth metal ions, ammonium ions, and combinations thereof;
where M1 is a first transition metal ion;
where M2 is a second transition metal ion;
forming a $A_XM1_YM2_Z(CN)_N.MH_2O$-CP composite:
where X is in a range of 0 to 2;
where Y is in a range of 0 to 2;
where Z is in a range of 0.1 to 2;
where N is in a range of 1 to 6; and,
where M is in a range of 0 to 7.

9. The method of claim 8 wherein providing the solution includes the CP material being selected from a group consisting of polyaniline (PANI) and polypyrrole (Ppy).

10. The method of claim 8 wherein forming the solution includes the first and second transition metal ions M1 and M2 each being independently derived, as selected from a group consisting of titanium (Ti), chromium (Cr), manganese (Mn), iron (Fe), cobalt (Co), nickel (Ni), copper (Cu), and zinc (Zn).

11. A method for the fabrication of a transition metal hexacyanometallate (TMHCM)-conductive polymer (CP) composite for use as an electrode in an electrochemical cell (battery) with a non-aqueous electrolyte, the method comprising:
providing a solution of monomers suspended in a matrix;
adding a $A_XM1_YM2_Z(CN)_N.MH_2O$ material to the monomers suspended in the matrix;
where A is selected from a group consisting of alkali metal ions, alkaline earth metal ions, ammonium ions, and combinations thereof;
where M1 is a first transition metal ion;
where M2 is a second transition metal ion;
where X is in a range of 0 to 2;
where Y is in a range of 0 to 2;
where Z is in a range of 0.1 to 2;
where N is in a range of 1 to 6;
where M is in a range of 0 to 7;
polymerizing the monomers; and,
forming a $A_XM1_YM2_Z(CN)_N.MH_2O$-CP composite.

12. The method of claim 11 wherein providing the solution includes the monomers being selected from a group consisting of aniline and pyrrole.

13. The method of claim 11 wherein forming the solution includes the A ions being selected from a group consisting of lithium ($Li^+$), sodium ($Na^+$), potassium ($K^+$), rubidium ($Rb^+$), cesium ($Cs^+$), calcium ($Ca^{2+}$), magnesium ($Mg^{2+}$), and ammonium ($NH_4^+$).

14. The method of claim 11 wherein forming the solution includes the first and second transition metal ions M1 and M2 each being independently derived, as selected from a group consisting of titanium (Ti), chromium (Cr), manganese (Mn), iron (Fe), cobalt (Co), nickel (Ni), copper (Cu), zinc (Zn).

15. The battery electrode of claim 1 wherein the conductive polymer is selected from a group consisting of polyaniline (PANI) and polypyrrole (Ppy).

16. The method of claim 4 wherein the CP material is selected from a group consisting of polyaniline (PANI) and polypyrrole (Ppy).

* * * * *